(12) United States Patent
Li

(10) Patent No.: US 11,750,726 B2
(45) Date of Patent: Sep. 5, 2023

(54) MASTER DEVICE, MOBILE PHONE, AND TERMINAL DEVICE

(71) Applicant: GUANGDONG OPPO MOBILE TELECOMMUNICATIONS CORP., LTD., Dongguan (CN)

(72) Inventor: Jie Li, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 99 days.

(21) Appl. No.: 17/356,484

(22) Filed: Jun. 23, 2021

(65) Prior Publication Data
US 2021/0329105 A1  Oct. 21, 2021

Related U.S. Application Data

(63) Continuation of application No. PCT/CN2019/122670, filed on Dec. 3, 2019.

(30) Foreign Application Priority Data

Dec. 29, 2018 (CN) .......................... 201822276774.3

(51) Int. Cl.
H04M 1/02 (2006.01)

(52) U.S. Cl.
CPC ....... H04M 1/0206 (2013.01); H04M 1/0264 (2013.01)

(58) Field of Classification Search
CPC .................................................. H04M 1/0206
See application file for complete search history.

(56) References Cited

U.S. PATENT DOCUMENTS

2002/0022499 A1* 2/2002 Newman ................ G06F 1/163
455/556.1
2002/0142799 A1  10/2002 Chu-Chia
(Continued)

FOREIGN PATENT DOCUMENTS

| CN | 101132579 A | 2/2008 |
| CN | 201274512 Y | 7/2009 |

(Continued)

OTHER PUBLICATIONS

Supplementary European Search Report, dated Jan. 28, 2022 from EP Application No. 19905765.4, 10 pages.
(Continued)

Primary Examiner — Hsinchun Liao
(74) Attorney, Agent, or Firm — BAYES PLLC

(57) ABSTRACT

A master device is capable of communicating with an external device. The master device is capable of installing a slave device and allowing the slave device being detached from the master device. The slave device is capable of communicating with the master device after it is detached from the master device. The master device includes a main body and a bracket connected to the main body. The main body includes a front surface and a rear surface disposed opposite to the front surface. The front surface is provided with a receiving groove. The bracket is located at a side of the front surface. The bracket is capable of being rotated to a first position and a second position relative to the main body. The bracket is received in the receiving groove when in the first position, and is rotated out of the receiving groove when in the second position.

16 Claims, 10 Drawing Sheets

(56) References Cited

U.S. PATENT DOCUMENTS

2009/0321609 A1   12/2009  Wang
2013/0229100 A1    9/2013  Siddiqui et al.

FOREIGN PATENT DOCUMENTS

CN      201893822 U    7/2011
CN      202059451 U   11/2011
WO    2007049933 A1   5/2007

OTHER PUBLICATIONS

International Search Report and the Written Opinion dated Mar. 4, 2020 From the International Searching Authority Re. Application No. PCT/CN2019/122670.
Notice of Allowance dated Jan. 14, 2020 from from China Application No. 201822276774.3.

\* cited by examiner

MASTER DEVICE, MOBILE PHONE, AND TERMINAL DEVICE

CROSS REFERENCE TO RELATED APPLICATIONS

This application is a continuation of International Application No. PCT/CN2019/122670, filed on Dec. 3, 2019, which claims priority of Chinese patent applications No. 201822276774.3 filed on Dec. 29, 2018, the entire contents of which are incorporated herein by reference

BACKGROUND

The present disclosure relates to mobile terminal technologies, and more particularly, to a master device, a mobile phone, and a terminal device.

At present, a performance and a thinness of mobile terminals such as smart phones and tablet computers are mutually restricted, and scenes in which mobile phones are used are extremely limited.

SUMMARY

Accordingly, there is a need to provide a master device, a mobile phone, and a terminal device.

One aspect of the present disclosure provides a master device capable of communicating with an external device, wherein the master device is capable of installing a slave device and allowing the slave device being detached from the master device, the slave device is capable of communicating with the master device after the slave device is detached from the master device, and the master device includes a main body including a front surface and a rear surface disposed opposite to the front surface, wherein the front surface is provided with a receiving groove; and a bracket connected to the main body and located at a side of the front surface, wherein the bracket is capable of being rotated to a first position and a second position relative to the main body, the bracket is received in the receiving groove when the bracket is located in the first position, and the bracket is rotated out of the receiving groove when the bracket is in the second position.

Another aspect of the present disclosure provides a mobile phone, including a master device including a main body and a bracket, wherein the main body includes a front surface and a rear surface disposed opposite to the front surface, and the front surface is provided with a receiving groove; and the bracket is connected to the main body and located at a side of the front surface, wherein the bracket is capable of being received in the receiving groove and rotated out of the receiving groove; and a slave device capable of being installed in the main body and detached from the main body. The bracket is capable of being rotated to a first position and a second position relative to the main body, the bracket is received in the receiving groove when the bracket is located in the first position, and the bracket is rotated out of the receiving groove when the bracket is in the second position so that the slave device is able to lean against the bracket.

Yet another aspect of the present disclosure provides a terminal device, including a master device including a main body and a bracket, wherein the main body is provided with a receiving groove, and the bracket is connected to the main body and is rotatable with respect to the main body so as to be received in the receiving groove or lean against the main body; and a slave device capable of being installed on the main body and detached from the main body, wherein the bracket is accommodated in the receiving groove, the slave device is able to be stacked on the main body and cover the bracket, and the slave device is able to lean against the bracket to stand on the main body when the bracket stands on the main body.

BRIEF DESCRIPTION OF THE DRAWINGS

In order to more clearly illustrate the embodiments of the present disclosure or the technical solutions in the related art, drawings to be used in the descriptions of the embodiments or the related art will be briefly introduced below. Obviously, the drawings described below only illustrate some embodiments of the present disclosure, and other drawings can be obtained according to these drawings without any creative efforts for those skilled in the art.

DETAILED DESCRIPTION

In order to facilitate the understanding of the present disclosure, the present disclosure will be described more fully hereinafter with reference to the accompanying drawings. Preferred embodiments of the present disclosure are given in the accompanying drawings. However, the present disclosure can be embodied in many different forms and is not limited to the embodiments described herein. In reality, these embodiments are provided so that the understanding of the disclosure of the present disclosure is more thorough and comprehensive.

"Terminal device" used here includes, but not limited to, a device connected in any one or more of the following connection manners and capable of receiving and/or sending a communication signal: (1) a wired connection manner, for example, a public switched telephone network (PSTN), a digital subscriber line (DSL), a digital cable and direct cable connection; and (2) a wireless interface manner, for example, a cellular network, a wireless local area network (WLAN), a digital television network like a digital video broadcasting handheld (DVB-H) network, a satellite network and an amplitude modulation (AM)-frequency modulation (FM) broadcast transmitter.

A terminal device configured to communicate by a wireless interface may be called a "mobile terminal". Examples of the mobile terminal include, but not limited to, the following electronic devices: (1) a satellite phone or a mobile phone; (2) a personal communication system (PCS) terminal capable of integrating a cellular radio phone and data processing, faxing and data communication capabilities; (3) a radio phone, a pager, internet/intranet access, a web browser, a memo pad, a calendar and a personal digital assistant (PDA) equipped with a global positioning system (GPS) receiver; (4) a conventional laptop and/or palmtop receiver, and (5) a conventional laptop and/or palmtop radio phone transceiver and the like.

Figure 1:
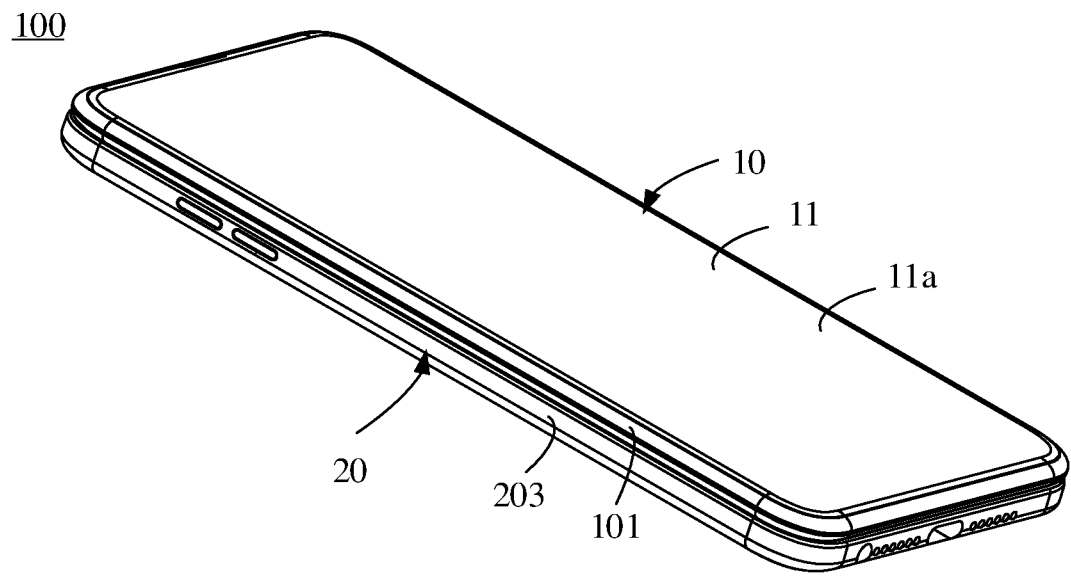
FIG. 1 is a three-dimensional schematic diagram of a mobile phone according to an embodiment of the present disclosure.
Figure 3:
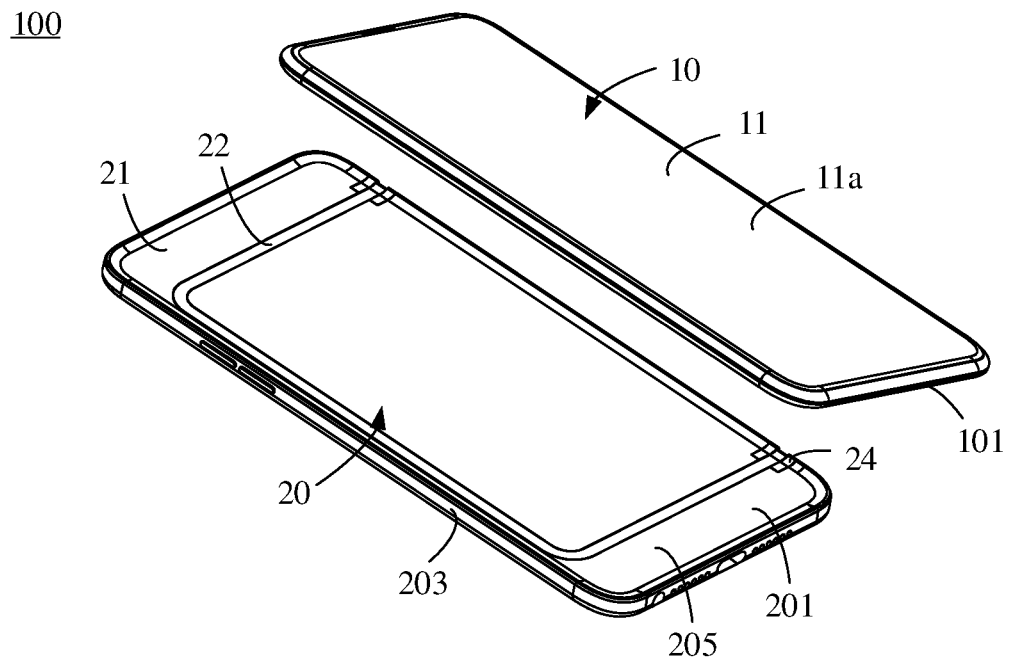
FIG. 3 is a three-dimensional schematic diagram of the mobile phone shown in FIG. 1 according to another embodiment of the present disclosure, wherein a slave device and a master device are separated, and a bracket is located in the first position.

Referring to FIG. 1 and FIG. 3, in one embodiment, the mobile phone 100 includes a slave device 10 and a master device 20. The slave device 10 includes a front surface 11a, a rear surface 12a (shown in FIG. 6), and a peripheral side surface 101. The rear surface 12a is arranged opposite to the front surface 11a, and the peripheral side surface 101 is connected to and between the front surface 11a and the rear surface 12a. The slave device 10 includes a display screen 11, and a displayable area of the display screen 11 faces a side where the front surface 11a is located. The master device 20 includes a main body 21 and a bracket 22. The main body 21 includes a first wireless transceiver unit and a first battery. The first battery is able to supply power to the first wireless transceiver unit. The slave device 10 can be installed in the main body 21 and the slave device 10 can be detached from the main body 21, and the main body 21 can be communicatively connected with the slave device 10 through the first wireless transceiver unit.

Figure 7:
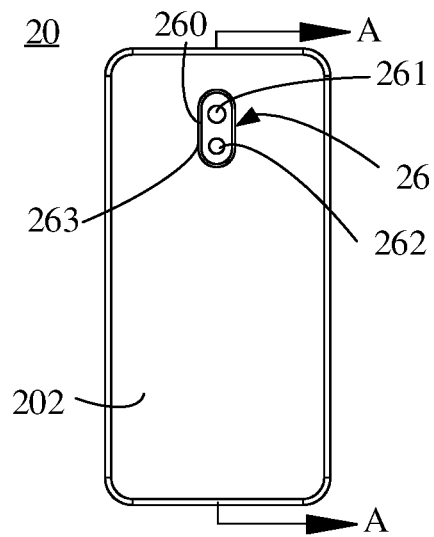
FIG. 7 is a rear view of the master device of the mobile phone shown in FIG. 3.

As shown in FIGS. 1, 3 and 7, in one embodiment, the main body 21 includes a front surface 201, a rear surface 202, and a side surface 112. The front surface 201 and the rear surface 202 are arranged opposite to each other, and the side surface 203 is connected to and between the front face 201 and the rear face 202. When the slave device 10 is installed in the main body 21, the rear surface 12a is attached to the front surface 201 and the peripheral side surface 101 is level with the side surface 203.

Figure 2:
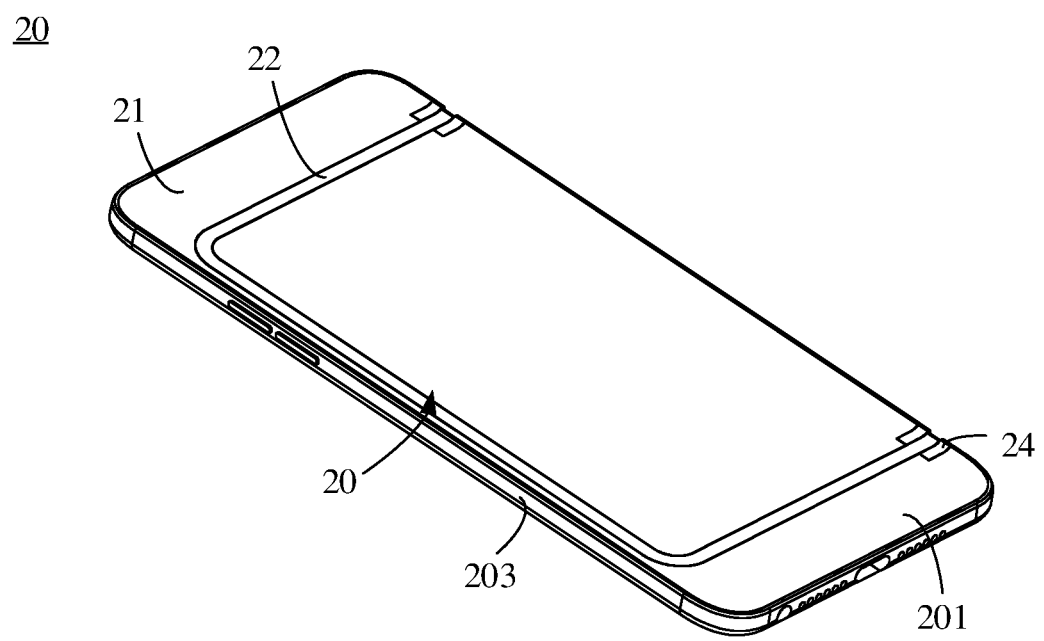
FIG. 2 is a perspective view of a master device of the mobile phone shown in FIG. 1 according to an embodiment of the present disclosure.

As shown in FIG. 2, in one embodiment, the front surface 201 is a flat surface, and the rear surface 12a is a flat structure that cooperates with the front surface 201. A plurality of magnets and magnetic metal parts are correspondingly provided on the master device 20 and the slave device 10 to make the slave device 10 can be reliably connected with the master device 20 when the slave device 10 is installed in the master device 20, thereby preventing the slave device 10 from being easily detached from the master device 20.

As shown in FIG. 3, in one embodiment, the front surface 201 is provided with a mounting groove 205, and the rear surface 12a is a curved surface structure that matches with the mounting groove 205. When the slave device 10 is installed on the master device 20, a part of the structure of the slave device 10 is accommodated in the mounting groove 205 and an edge of the front surface 201 surrounds the rear surface 12a, and the side surface 203 is level with the peripheral side surface 101. With the above structure, the slave device 10 can be better accommodated in the mounting groove 205, which is beneficial to the positioning of the slave device 10 on the master device 20, and can play better protective effects on the master device 20.

Figure 4:
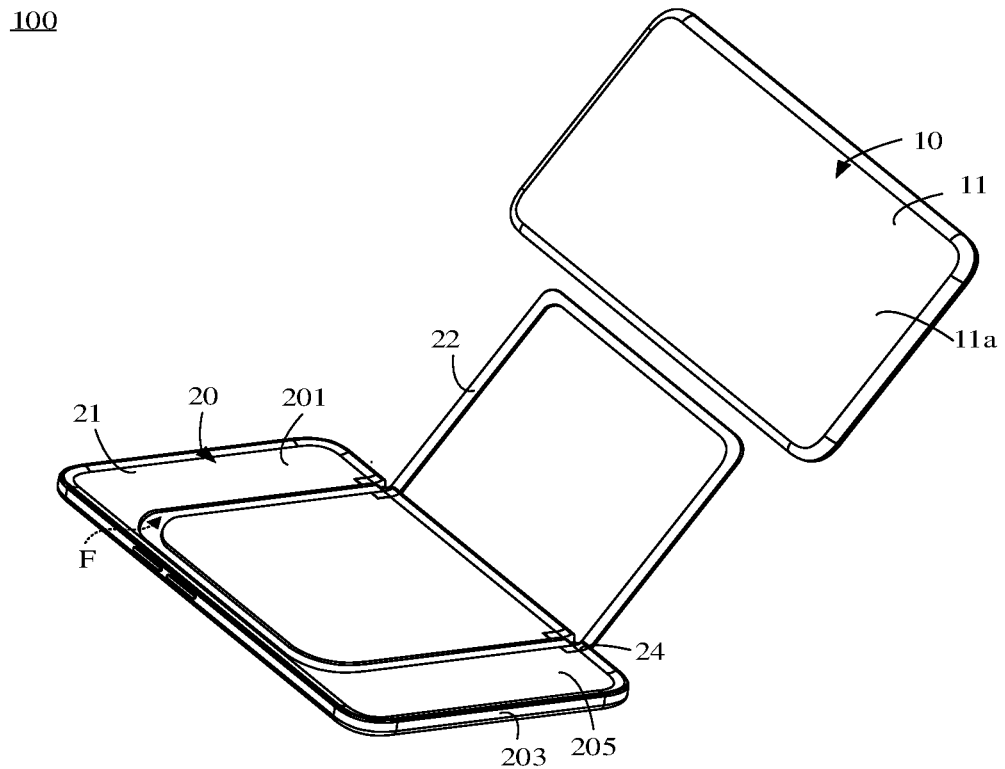
FIG. 4 is a three-dimensional schematic diagram of the mobile phone shown in FIG. 3, wherein the bracket is located in a second position.
Figure 5:
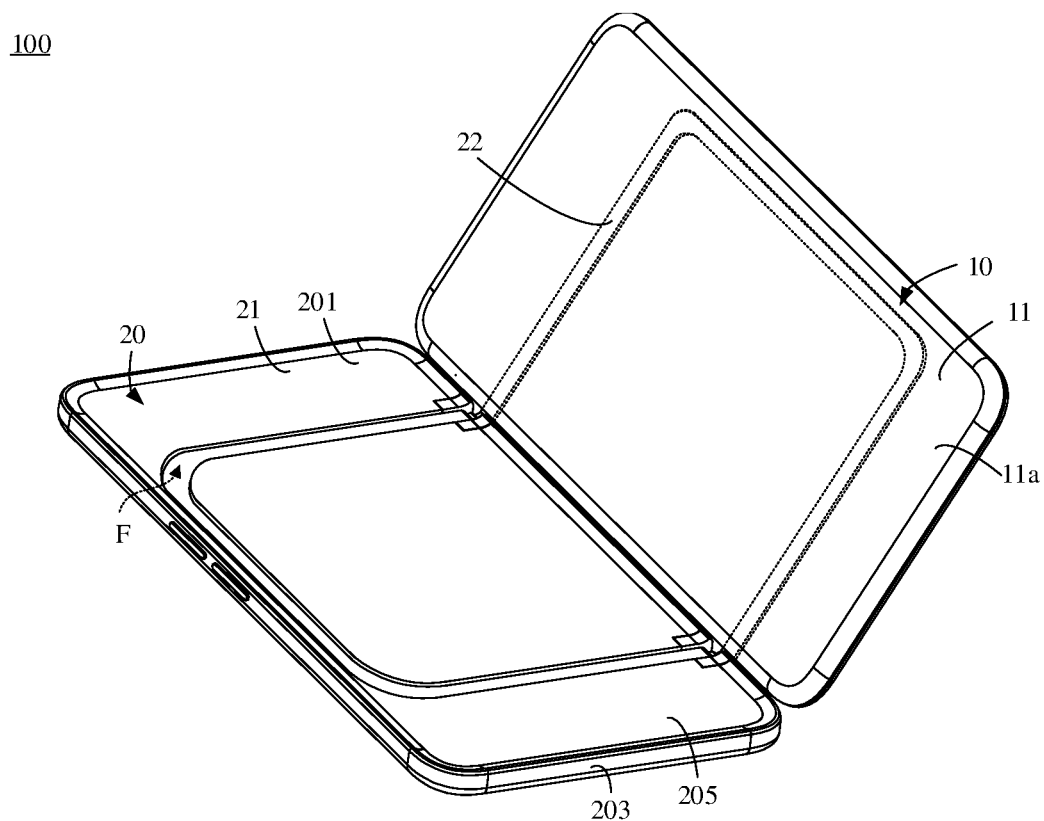
FIG. 5 is a three-dimensional schematic diagram of the mobile phone shown in FIG. 3, wherein the bracket is located in the second position, and the slave device is leaning on the bracket.
Figure 6:
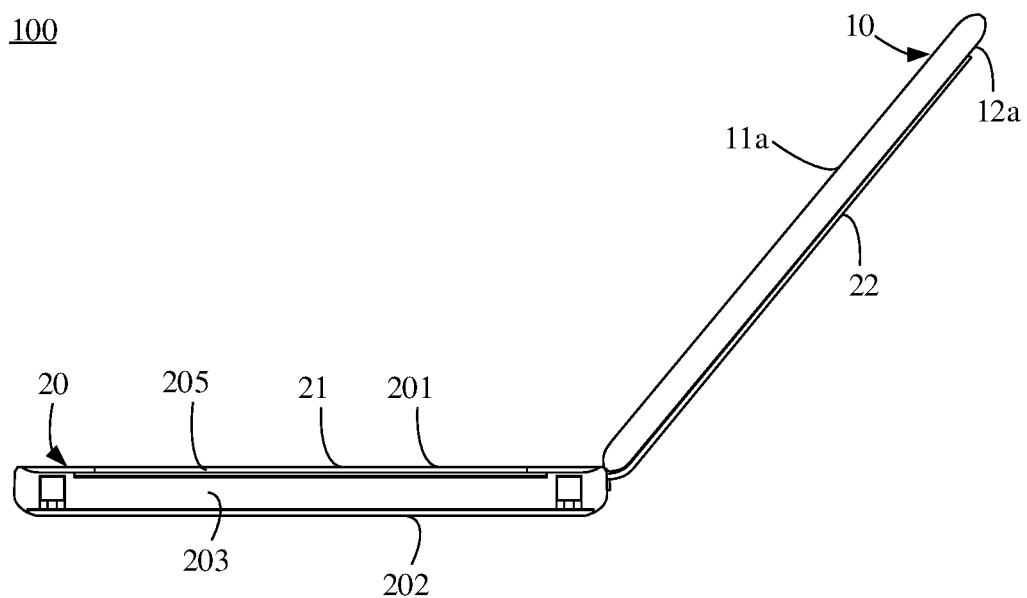
FIG. 6 is a side view of the mobile phone shown in FIG. 5.

As shown in FIGS. 3-6, in one embodiment, the bracket 22 is connected to the main body 21, and the main body 21 is provided with a receiving groove F. The bracket 22 is disposed in the receiving groove F and can be rotated to the first position and the second position with respect to the main body. 21. As shown in FIG. 3, when the bracket 22 is in the first position, the bracket 22 is received in the receiving groove F so that the bracket 22 can be moved to the first position and received in the receiving groove F when the bracket 22 is not in use, thereby stacking the slave device 10 on the main body 21 for use or carrying. In addition, since the bracket 22 can be received in the receiving groove F without being obtrusive, the overall aesthetic feeling of the appearance of the master device 20 can be improved. As shown in FIGS. 4-6, when the bracket 22 is in the second position, the bracket 22 is rotated out of the receiving groove F and is at a right angle or an obtuse angle with the main body 21, so that the slave device 10 can lean against the bracket 22 and the device 10 can be placed against the bracket 22 and inclined relative to the main body 21 and then the contents of the displayable area of the slave device 10 can be viewed.

In one embodiment, the slave device 10 includes a second wireless transceiver unit and a second battery. The second battery can supply power to the display screen 11 and the second wireless transceiver module. It is understood that the slave device 10 is in communication connection with the first wireless transceiver unit through the second wireless transceiver unit, thereby achieving data and signal transmission with the main body 21. The first battery can be a nuclear battery, such as a tritium battery. The nuclear battery is smaller, lighter and thinner, and has a long service lifespan so that it can provide electrical energy to the main body 21, the first wireless transceiver unit and other electronic components in the main body 21 for a long time. In other embodiments, the first battery may also include a lithium battery or the like, and the first battery may be repeatedly charged and discharged for multiple times. In one embodiment, the second battery may be a lithium battery that can be repeatedly charged and discharged for multiple times, or may be other types of battery, which is not limited herein.

As shown in FIGS. 5 and 7, in one embodiment, the receiving groove F penetrates the front surface 201 and the side surface 203. When the bracket 22 is needed to be rotated out from the receiving groove F to the second position, since the receiving groove F penetrates the side end surface 203 so that the main body 21 will not block the bracket 22 at the side surface 203, and there is no need to provide a buckle and the bracket 22 is easily rotated out of the receiving groove F.

As shown in FIG. 3, in one embodiment, the main body 21 is in a rectangular block shape, and the side surface 203 includes a top surface, a bottom surface, a left surface, and a right surface. The top surface and the bottom surface are connected to and between the left surface and the right surface. The left surface and the right surface are connected to and between the top surface and the bottom surface. It is defined that an upward end of the main body 21 is the top end, a downward end of the main body 21 is the bottom end, a left end of the main body 21 is the left end, and a right end of the main body 21 is the right end while a receiver is facing an ear of a user and the microphone is facing a mouth of the user when the user uses the mobile phone 100 to make a normal call. A distance between the top end and the bottom end is a length of the main body 21, and a distance between the left end and the right end is a width of the main body 21. The bracket 22 is in a U-shape, and an opening of the U-shape faces the right end of the main body 21. The bracket 22 can rotate around a line connecting the two ends of the opening as an axis, so as to rotate to the first position and the second position.

Figure 8:
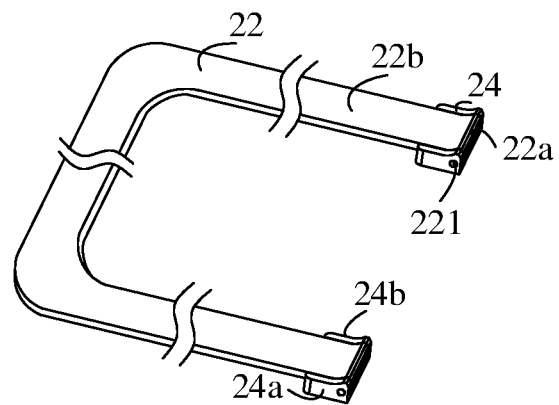
FIG. 8 is a three-dimensional schematic diagram of the bracket of the mobile phone shown in FIG. 3.
Figure 9:
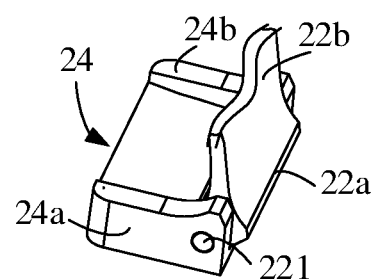
FIG. 9 is a three-dimensional schematic diagram of a base of the bracket shown in FIG. 8.

As shown in FIG. 3, FIG. 8 and FIG. 9, in one embodiment, the master device 20 includes a base 24, the base 24 includes two opposite side plates 24a and 24b, and the two side plates 24a and 24b define a part of the receiving groove F. An end of the bracket 22 is located between the two side plates 24a and 24b, and it is rotatably connected with the side plates 24a and 24b. With this arrangement, the base 24 for the bracket 22 can be processed separately, thereby reducing the structural complexity of the housing of the main body 21, so as to improve the production efficiency. In other embodiments, the base 24 and the housing of the main body 21 are integrally formed, and the base 24 can also be installed with the bracket 22 to meet the needs of moving the support bracket 22 to the first position and the second position relative to the main body 21.

As shown in FIG. 8 and FIG. 9, in one embodiment, the bracket 22 includes a rotating portion 22a and a supporting portion 22b. The supporting portion 22b is a U-shaped rod, the rotating portion 22a is located at an end of the supporting portion 22b, and the rotating portion 22a and the supporting portion 22b are integrally formed. The rotating portion 22a is provided with a rotating shaft 221, the side plates 24a and 24b are provided with shaft holes 241 that can be rotatably matched with the rotating shaft 221, so that the rotating portion 22a can rotate about the rotating shaft 221 relative to the support portion 24 and the supporting portion 22b can be accommodated in the receiving groove F or rotates out from the receiving groove F. It is noted that, in other embodiments, the side plates 24a and 24b are provided with a rotating shaft, and the rotating portion 22a is provided with a shaft hole that is rotatably matched with the rotating shaft 221, so that the rotating portion 22a can also be rotated around the rotating shaft with respect to the base 24 and details thereof are not described here again.

In one embodiment, the receiving groove F is matched with the bracket 22. Depending on the shape of the bracket 22, the receiving groove F may be in a C-shape or a square-shape, which is not specifically limited here. When the bracket 22 is in the first position, the bracket 22 fills the receiving groove F so that a surface of the bracket 22 facing away from the rear surface 202 is level with the front surface 201. This not only improves the overall aesthetic feeling of the main body 20, but also the bracket 22 does not cause any interference when the slave device 10 is stacked on the main body 21.

In one embodiment, the rear surface 12a and the end surface 201 are provided with contacts at corresponding positions, and the contacts on the rear surface 12a are matched with the contacts on the front surface 201 to realize the transmission of current or data between the master device 20 and the slave device 10 when the slave device 10 is assembled with the master device 20 through attaching the rear surface 12a to the front surface 201.

As shown in FIG. 7, in an embodiment, the main body 21 includes a camera assembly 26. The rear surface 202 of the main body 21 is provided with a through hole 260, the through hole 260 is close to the top end of the main body, and the camera assembly 26 passes through the through hole 260 and is fixed to the rear end surface 202.

Figure 10:
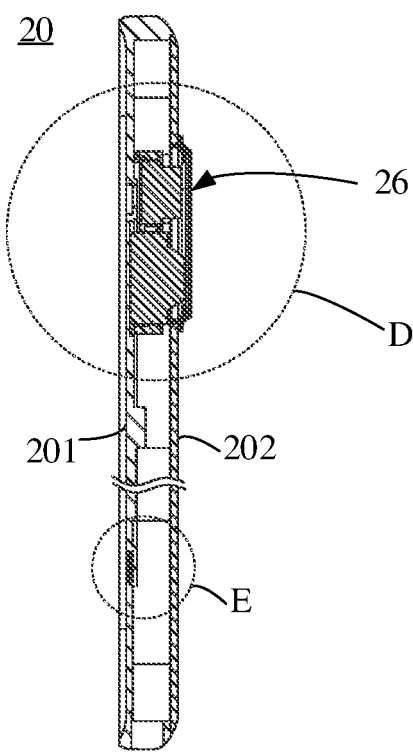
FIG. 10 is a schematic cross-sectional view of the A-A part of the master device shown in FIG. 7.
Figure 11:
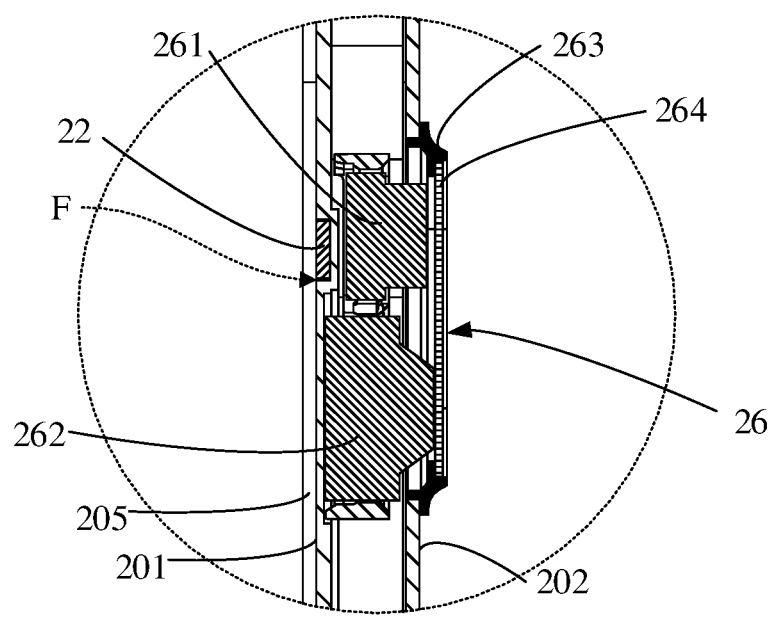
FIG. 11 is an enlarged schematic view of the D part of the structure shown in FIG. 10.

As shown in FIGS. 10 and 11, in one embodiment, the camera assembly 26 includes a first camera 261, a second camera 262, a decorative frame 263 and a lens 264. The first camera 261 and the second camera 262 are arranged side by side in the master device 20 along the length direction of the master device 20. A light incident surface of the first camera 261 and a light incident surface of the second camera 262 are exposed out of the rear surface 202. The first camera 261 and the second camera 262 are substantially level with a side close to the rear surface 202. The decorative frame 263 penetrates the through hole 260 and is fixed in the through hole 260, and a part of the structure of the decorative frame 263 protrudes from the rear surface 202. The lens 264 is fixed on the decorative frame 263 and covers the first camera 261 and the second camera 262, and the light incident surface of the first camera 261 and the light incident surface of the second camera 262 are on the lens 264.

As shown in FIGS. 10 and 11, in an embodiment, the first camera 261 is a secondary camera, and the second camera 262 is a primary camera. A distance between the front surface 201 and the rear surface 202 is defined as a thickness of the master device 20. In the thickness direction of the master device 20, a thickness of the first camera 261 is less than a thickness of the second camera 262. The first camera 261 overlaps the bottom of the receiving groove F, and an orthographic projection of the second camera 262 and the bottom of the receiving groove F on a reference plane are not overlapped, and the reference plane is a plane perpendicular to the thickness direction of the main body. In the length direction of the master device 20, a size of the orthographic projection of the bottom of the receiving groove F on the front surface 201 is not greater than a size of the orthographic projection of the first camera 261 on the front surface 201. That is, the size of the bottom of the receiving grooving F in the length direction of the master device 20 is less than or equal to the size of the first camera 261 in the length direction of the master device 20. In the width direction of the master device 20, the orthographic projection of the bottom of the receiving groove F on the front surface 201 penetrates the orthographic projection of the first camera 261 on the front surface 201, that is, the size of the bottom of the receiving groove F in the width direction of the master device 20 is greater than that the size of the first camera 261 on the master device 20 in the width direction. As shown in FIG. 10, in the thickness direction of the master device 20, the opening of the receiving groove F faces away from the first camera 261, and the receiving groove F is recessed in the direction of the first camera 261, which may make full uses of space of the master device 20 in the thickness direction. When the bracket 22 is in the first position, the bracket 22 is accommodated in the receiving groove F, and the bracket 22 and the first camera 261 are stacked in the thickness direction of the master device 20, so that the space in the master device 20 can be effectively used and the increase of the thickness of the master device 20 is avoided, which is beneficial to improve the lightness and thinness of the master device 20.

Figure 13:
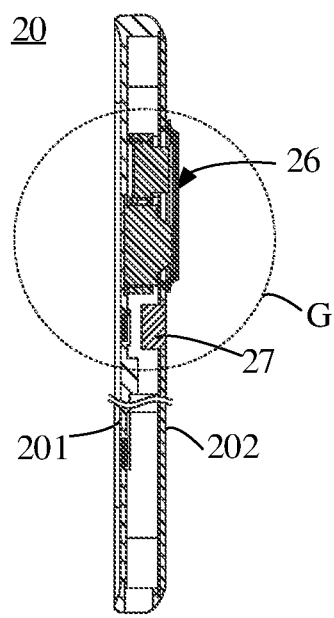
FIG. 13 is a schematic cross-sectional view of the A-A part of the master device shown in FIG. 7 according to another embodiment of the present disclosure.
Figure 14:
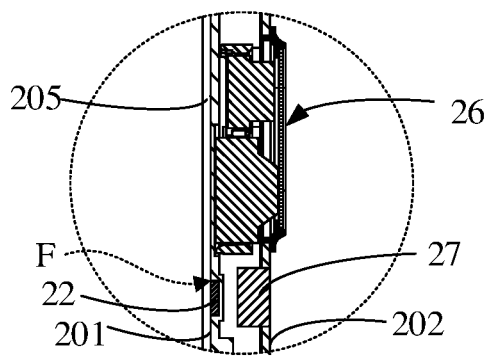
FIG. 14 is an enlarged schematic diagram of the part G of the structure shown in FIG. 13.

As shown in FIGS. 13 and 14, in one embodiment, the main body 21 includes the camera assembly 26 and a flash assembly 27. A light incident surface of the camera assembly 26 and a light-exiting surface of the flash assembly 27 are exposed out of the rear surface 202. A thickness of the flash assembly 27 is less than a thickness of the camera assembly 26, the flash assembly 27 is stacked on the bottom of the receiving groove F, and the camera assembly 26 is misaligned with the bottom of the receiving groove F so that the opening of the receiving groove F faces away from the flash assembly 27. In the length direction of the master device 20, a size of the orthographic projection of the bottom of the receiving groove F on the front surface 201 is not greater than a size of the orthographic projection of the flash assembly 27 on the front surface 201, that is, the size of the bottom of the receiving groove in the length direction of the main body 20 is less than or equal to the size of the flash assembly 27 in the length direction of the main body 20. In the width direction of the main body 20, the orthographic projection of the bottom of the receiving groove F on the front surface 201 penetrates the orthographic projection of the flash assembly 27 on the front surface 201, that is, the size of the bottom of the receiving groove F in the width direction of the master device 20 is greater than the size of the flash assembly 27 in the width direction of the master device 20. As shown in FIG. 14, in the thickness direction of the master device 20, the opening of the receiving groove F faces away from the flash assembly 27, and the receiving groove F is recessed in the direction of the flash assembly 27 so that the space in the thickness direction of the master device 20 can be fully utilized. When the bracket 22 is in the first position, the bracket 22 is accommodated in the receiving groove F, and the bracket 22 and the flash assembly 27 are stacked in the thickness direction of the main body 20, so that the space in the main body 20 is effectively used, and the increase of the main body is avoided, which is conducive to reduce the weight and thickness of the master device 20.

Figure 12:
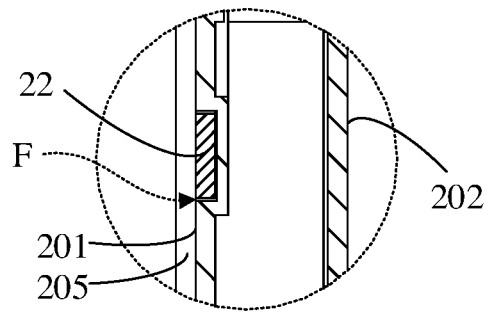
FIG. 12 is an enlarged schematic diagram of the E part of the structure shown in FIG. 10.

As shown in FIG. 12, in one embodiment, the bracket 22 is a U-shaped structure. FIG. 11 shows a cross-sectional view of one of the two parallel sides of the bracket 22, and FIG. 12 shows a cross-sectional view of the other of the two parallel sides of the bracket 22. The receiving groove F is U-shaped, and the receiving groove F includes two parallel grooves, one of which is in the same thickness direction as the first camera 261, and the other can be arranged according to the internal components of the master device 20. The opening is carried out according to the situation, and try to open at a position where the master device 20 is not full of components in the thickness direction, so that the internal space of the master device 20 can be effectively utilized and an increasement of the thickness of the master device 20 can be avoided.

In another embodiment, the camera assembly 26 can be arranged horizontally, that is, the first camera 261 and the second camera 262 are arranged side by side in the width direction of the master device 20, and the receiving groove F is opened at the upper or lower end of the camera assembly 26 so that the receiving groove F and camera assembly 26 are staggered and an effective arrangement of the components inside the master device 20 reserves space for the receiving groove F, which can also realize that the thickness of the master device 20 is not increased when the bracket 22 is in the first position.

In one embodiment, the main body 21 includes a magnetic attraction member, and the slave device 10 includes a magnetic attraction fitting member, and when the slave device 10 is stacked on the front end from the side where the rear surface 12a is located or the side where the front surface 11a is located, the magnetic attraction member can attract the magnetic attraction fitting member to connect the slave device 10 to the main body 21. It is noted that when the slave device 10 needs to be stacked on the main body 21, the bracket 22 can be rotated to the first position. Since the bracket 22 can be received in the receiving groove F when the slave device 10 is in the first position, the slave device 10 is not interfered by the bracket 22 and it can be more closely stacked on the main body 21, and it is convenient for the magnetic attraction member to be aligned with the magnetic attraction fitting piece at the same time to ensure the magnetic attraction effect of the magnetic attraction member and the magnetic attraction fitting member.

In an embodiment, one of the magnetic attraction member and the magnetic attraction fitting member includes a magnet. In other embodiments, the magnetic attraction member and the magnetic attraction fitting member are both magnets, regardless of whether a side of the slave device 10 back to the front surface 11a or a side of the slave device 10 facing the front surface 11a, the slave device 10 and the main body 21 can be fixed by magnetic attraction between the magnets. While a part of the magnets on the slave device 10 turns to a different side of the slave device 10 to face the main body 21, although the magnetic pole orientation of the slave device 10 changes, there is always a corresponding magnet on the main body 21 that can magnetically cooperate with the magnet on the slave device 10.

Figure 15:
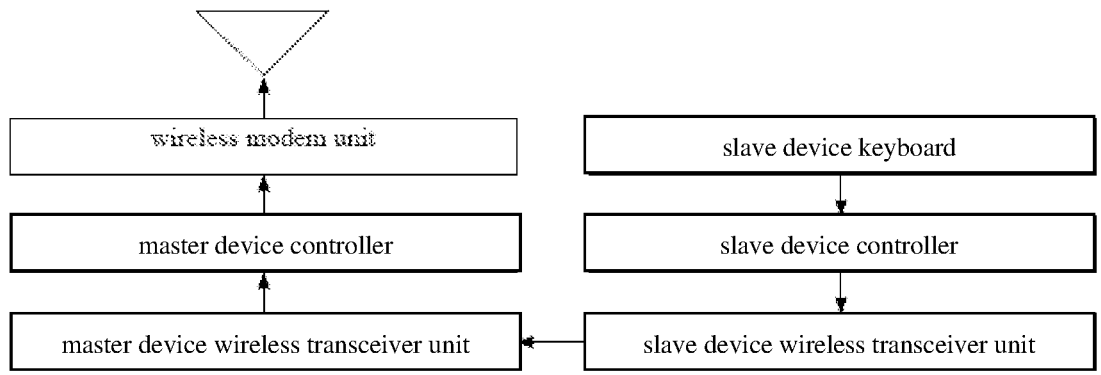
FIG. 15 is a flowchart of a mobile phone in a first working state according to an embodiment of the present disclosure.
Figure 16:
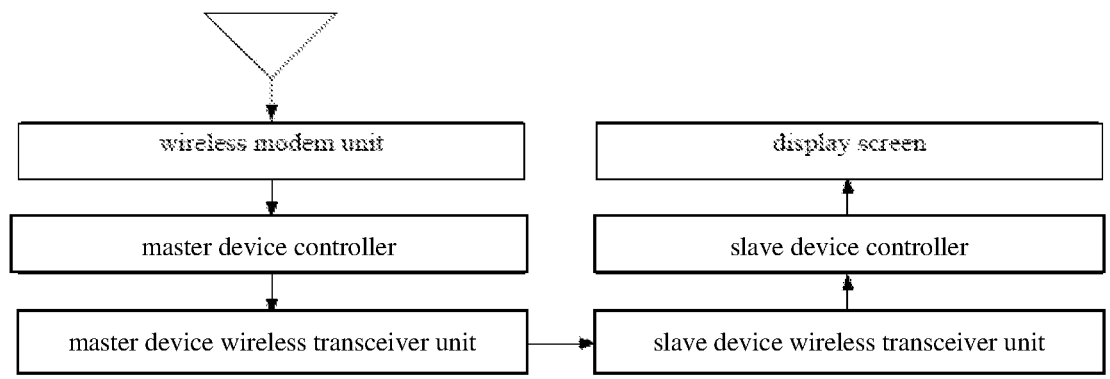
FIG. 16 is another flowchart of the mobile phone illustrated in FIG. 15 in the first working state.

As illustrated in FIG. 15 and FIG. 16, in one embodiment, the slave device 10 includes a slave device keyboard, a slave device controller, and a slave device wireless transceiver unit. The master device includes a wireless modem unit, a master device controller, and a master device wireless transceiver unit. In a first working state of the mobile phone 100, a control command output by the slave device keyboard is modulated by the slave device wireless transceiver unit and sent to the master device wireless transceiver unit under control of the slave device controller, and is modulated by the wireless modem unit and sent to the air under control of the master device controller. A control signal from the air is demodulated by the wireless modem unit, passed through the master device controller, modulated by the master device wireless transceiver unit and sent to the slave device, and is displayed by the display screen 11 under the control of the slave device controller after received by the slave device wireless transceiver unit.

Figure 17:
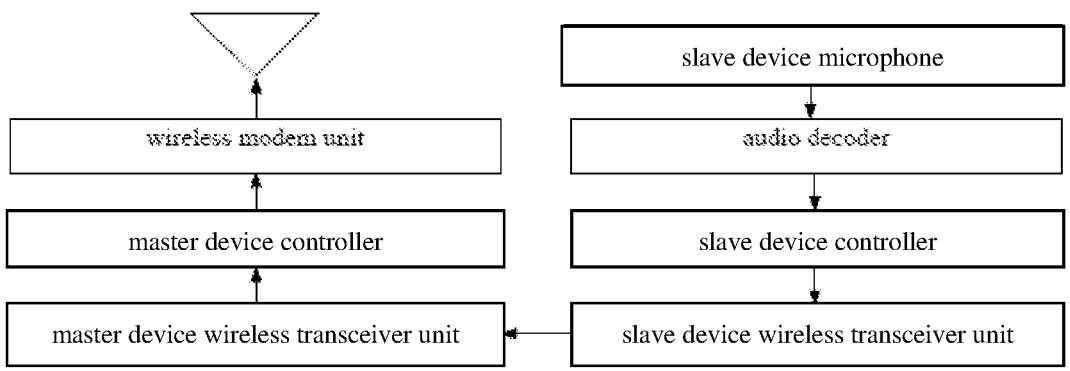
FIG. 17 is a flowchart of a mobile phone in a second working state according to an embodiment of the present disclosure.
Figure 18:
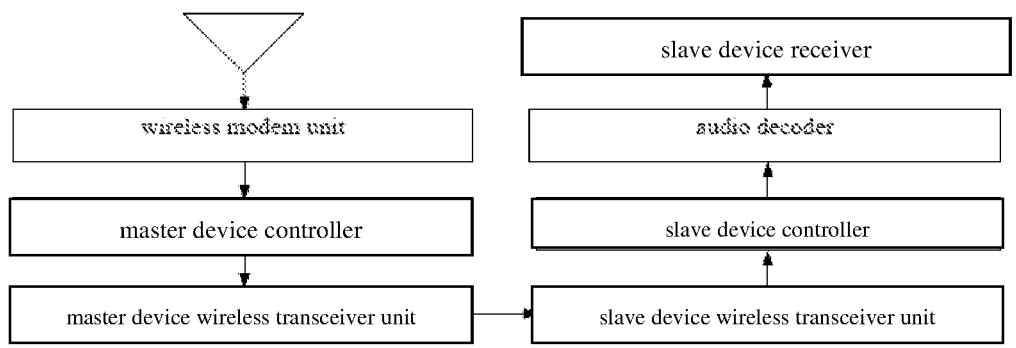
FIG. 18 is another flowchart of the mobile phone illustrated in FIG. 17 in the second working state.

As illustrated in FIG. 17 and FIG. 18, in one embodiment, the slave device 200 includes a slave device controller, a slave device microphone, a slave device receiver, a slave device audio coder, a slave device audio decoder, and a slave device wireless transceiver unit communicable with the master device wireless transceiver unit. The audio encoder enables the audio signal to be encoded during transmission, which is convenient for transmission, storage or encryption. The audio decoder can decode the encoded audio signal. The master device includes a wireless modem unit, a master device controller, and a master device wireless transceiver unit communicable with the slave device wireless transceiver unit. In a second working state of the mobile phone 100, an audio signal from the slave device microphone is coded by the slave device audio coder and transmitted to the slave device controller, and is sent out by the slave device wireless transceiver unit under the control of the slave device controller; after received by the master device wireless transceiver unit and under the control of the master device controller, the signal is transmitted to the wireless modem unit and sent to the air after modulated by the wireless modem unit. The signal from the air is demodulated by the wireless modem unit and sent to the master device controller, under the control of the master device controller, the signal is transmitted to the master device wireless transceiver unit and sent to the slave device 200 after modulated by the master device wireless transceiver; under the control of the slave device controller, a demodulated audio signal by the slave device wireless transceiver unit is decoded by the slave device audio decoder and output by the slave device receiver. It could be understood that the slave device audio coder can be an independent hardware unit, or can be integrated into the slave device microphone or into the slave device controller, and in terms of the function, the slave device audio coder can be an audio codec which also has an audio decoding function. The slave device audio decoder can be an independent hardware unit, or can be integrated into the slave device receiver or into the slave device controller, and in terms of the function, the slave device audio decoder can be an audio codec which also has an audio coding function.

Figure 19:
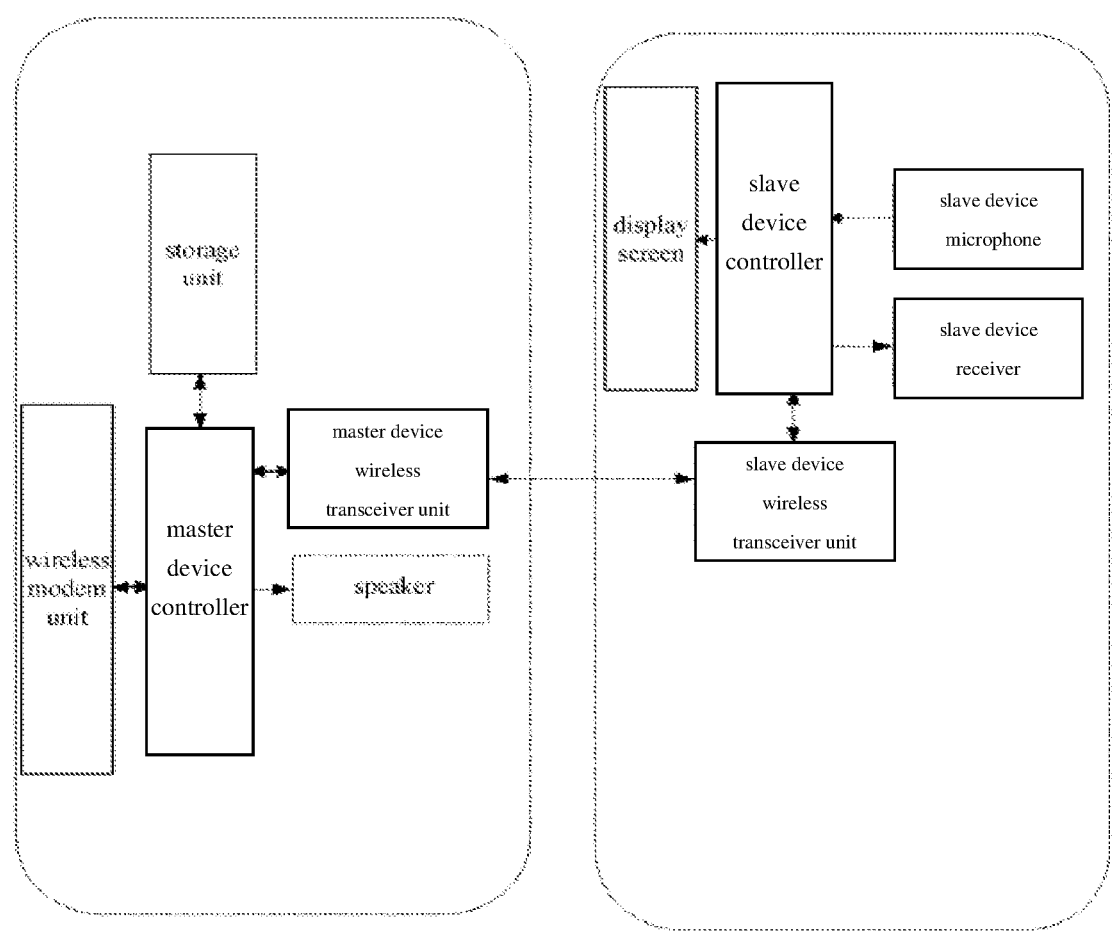
FIG. 19 is a schematic view of a unit structure of a mobile phone according to an embodiment of the present disclosure.
Figure 20:
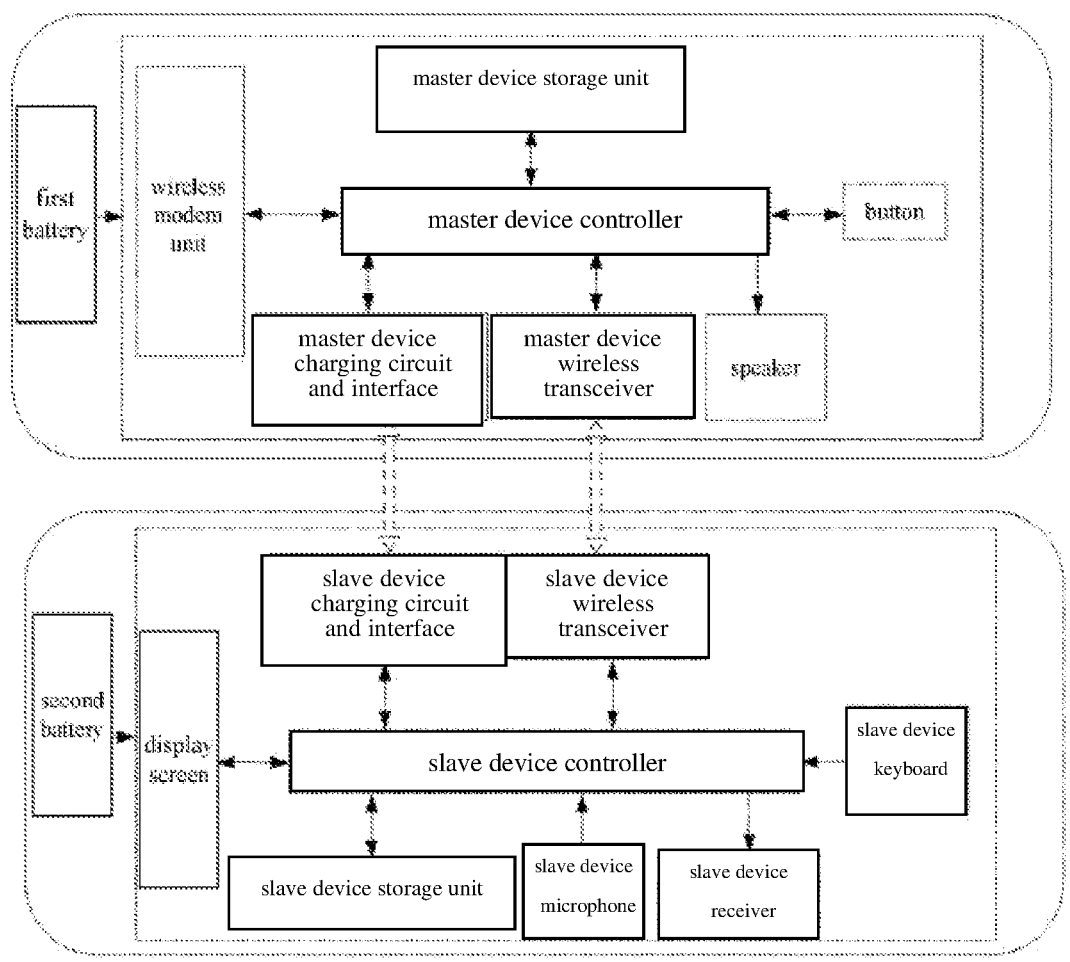
FIG. 20 is a schematic view of a unit structure of a mobile phone in another embodiment of the present disclosure.

As illustrated in FIG. 19 and FIG. 20, in one embodiment, the slave device 10 includes a slave device controller and a slave device wireless transceiver unit communicable with the master device wireless transceiver unit. The master device 20 includes a wireless modem unit, a master device controller, and a master device wireless transceiver unit communicable with the slave device wireless transceiver unit. The master device controller can communicate with the wireless modem unit and the master device wireless transceiver unit. The slave device 10 can be accessible to a communication network through the master device 20.

Figure 21:
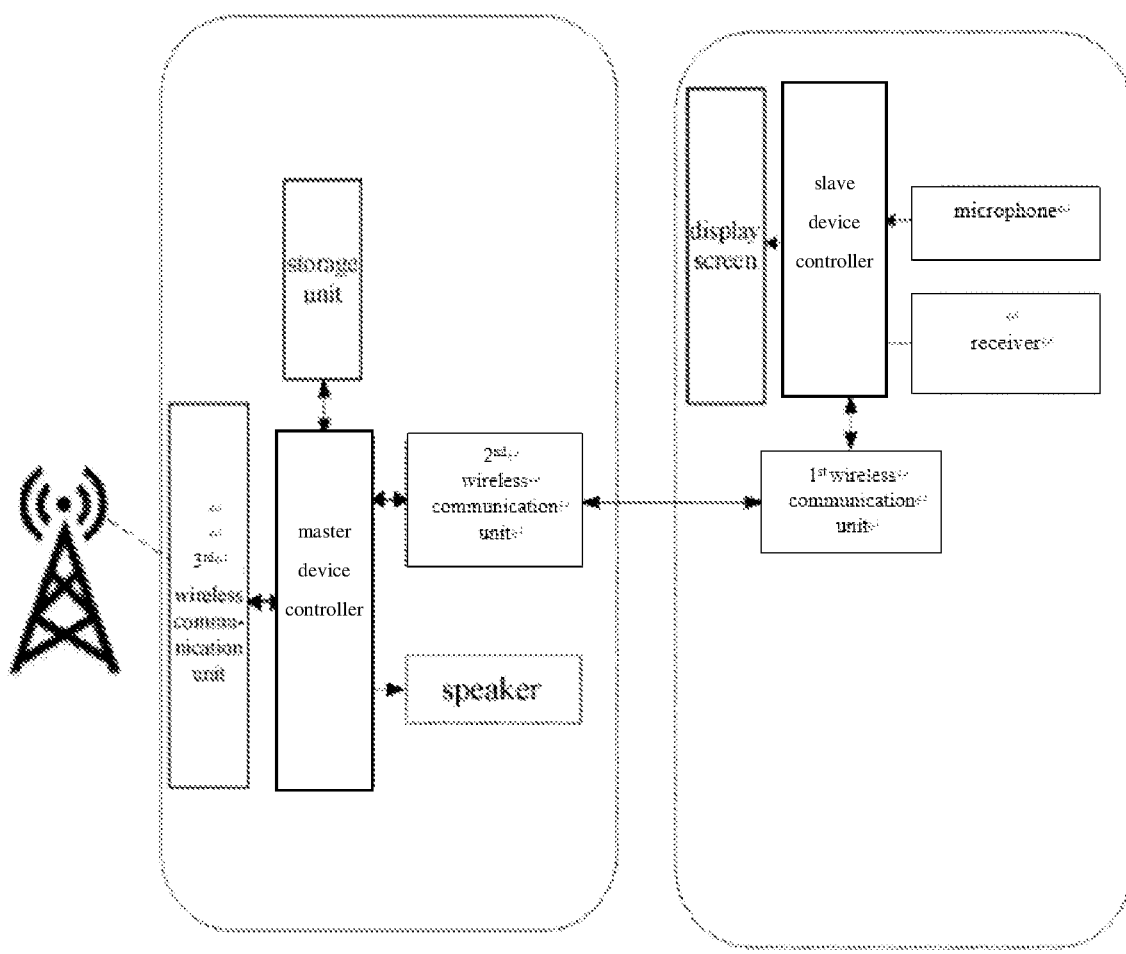
FIG. 21 is a schematic view of a unit structure of a mobile phone in yet another embodiment of the present disclosure.

Further, as illustrated in FIG. 21, the slave device 10 includes a slave device controller and a first wireless communication unit. The slave device controller is communicable with the first wireless communication unit. The master device 20 includes a master device controller, a second master device wireless communication unit, and a third master device wireless communication unit. The master device controller is communicable with the second wireless communication unit and the third wireless communication unit. The second wireless communication unit is communicable with the first master device wireless communication unit, and the third wireless communication unit is communicable with a base station. In one embodiment, the second wireless communication unit and the first wireless communication unit are both a low power Bluetooth communication unit. In other embodiments, the second wireless communication unit and the first wireless communication unit can both be a wireless fidelity (WiFi) communication unit.

The technical features of the above-described embodiments may be arbitrarily combined. For the sake of brevity of description, all possible combinations of the technical features in the above embodiments are not described. However, as long as there is no contradiction in the combinations of these technical features, all of the combination should be considered to fall within the scope of the present specification.

The above-mentioned embodiments are merely illustration of several embodiments of the present disclosure, and the description thereof is specific and detailed, but is not to be construed as limiting the scope of the present disclosure. It should be noted that a number of variations and modifications may be made by those skilled in the art without departing from the concept of the present disclosure, all of which fall in the protection scope of the present disclosure. Therefore, the protection scope of the present disclosure should be subject to the appended claims.

What is claimed is:

1. A master device capable of communicating with an external device, wherein the master device is capable of installing a slave device and allowing the slave device being detached from the master device, the slave device is capable of communicating with the master device after the slave device is detached from the master device, and the master device comprises:

a main body comprises a front surface and a rear surface disposed opposite to the front surface, wherein the front surface is provided with a receiving groove; and a bracket connected to the main body and located at a side of the front surface, wherein the bracket is capable of being rotated to a first position and a second position relative to the main body, the bracket is received in the receiving groove when the bracket is located in the first position, and the bracket is rotated out of the receiving groove when the bracket is in the second position, so that the slave device is able to lean against the bracket to stand on the main body, wherein:

the master device comprises a base and the base comprises two opposite side plates;

the two side plates define a part of the receiving groove;

an end of the bracket is located between the two side plates, wherein the end of the bracket is rotatably connected with the side plates;

the bracket comprises a rotating portion and a supporting portion;

one of the rotating portion and the side plates is provided with a rotating shaft, and the other one of the rotating portion and the side plates is provided with a shaft hole that is rotatably matched with the rotating shaft; and the supporting portion comprises an U-shaped rod, and the rotating portion is located at an end of the supporting portion, and the rotating portion and the supporting portion are integrally formed.

2. The master device according to claim 1, wherein:

the main body comprises a camera assembly;

the camera assembly comprises a first camera and a second camera;

a light incident surface of the first camera and a light incident surface of the second camera are exposed out of the rear surface;

a thickness of the first camera is less than a thickness of the second camera;

the first camera overlaps a bottom of the receiving groove, and an orthographic projection of the second camera and the bottom of the receiving groove on a reference plane are not overlapped, and the reference plane is a plane perpendicular to a thickness direction of the main body; and an opening of the receiving groove faces away from the first camera.

3. The master device according to claim 2, wherein:

the main body comprises a side surface connected to and between the front surface and the rear surface;

the receiving groove penetrates the front surface and the side surface;

the side surface comprises a top surface, a bottom surface opposite to the top surface, a left surface and a right surface opposite to the left surface, wherein the top surface is connected to one end of each of the left surface and the right surface, and the bottom surface is connected to the other end of each of the left surface and the right surface;

a distance between the top surface and the bottom surface is a length of the master device and a distance between the left surface and the right surface is a width of the master device;

a size of the orthographic projection of the bottom of the receiving groove on the front surface is not greater than a size of the orthographic projection of the first camera on the front surface in the length direction of the master device; and an orthographic projection of the bottom of the receiving groove on the front surface overlaps an orthographic projection of the first camera on the front surface in the width direction of the master device.

4. The master device according to claim 2, wherein:
the rear surface is provided with a through hole;
the camera assembly comprises a decorative frame;
the camera assembly comprises a lens, and the lens is fixed on the decorative frame and covers the first camera and the second camera; and
the light incident surface of the first camera and the light incident surface of the second camera are on the lens.

5. The master device according to claim 1, wherein:
the main body comprises a camera assembly and a flash assembly;
a light incident surface of the camera assembly and a light-exiting surface of the flash assembly are exposed out of the rear surface;
a thickness of the flash assembly is less than a thickness of the camera assembly; and
the flash assembly is stacked on a bottom of the receiving groove, and the camera assembly is misaligned with the bottom of the receiving groove so that the opening of the receiving groove faces away from the flash assembly.

6. The master device according to claim 1, wherein a surface of the bracket facing away from the rear surface is level with the front surface when the bracket is in the first position.

7. A mobile phone, comprising:
a master device comprising a main body and a bracket, wherein:
the main body comprises a front surface and a rear surface disposed opposite to the front surface, and the front surface is provided with a receiving groove; and
the bracket is connected to the main body and located at a side of the front surface, wherein the bracket is capable of being received in the receiving groove and rotated out of the receiving groove, and the bracket is capable of being rotated to a first position and a second position relative to the main body, wherein the bracket is received in the receiving groove when the bracket is located in the first position, and the bracket is rotated out of the receiving groove when the bracket is in the second position, and
a slave device capable of being installed in the main body and detached from the main body, wherein when the bracket is in the second position, the slave device is able to lean against the bracket to stand on the main body, wherein:
the main body comprises a side surface connected to the front surface and the rear surface;
the slave device comprises a display screen;
the slave device comprises a front surface, a rear surface, and a peripheral side surface, wherein the rear surface of the slave device is arranged opposite to the front surface of the slave device, and the peripheral side surface is connected to and between the front surface and the rear surface of the slave device;
a displayable area of the display screen faces a side where the front surface of the slave device is located; and
the rear surface of the slave device overlaps the front surface of the master device and the side surface is level with the peripheral side surface when the slave device is installed in the main body;
wherein the front surface of the master device is provided with a mounting groove, the receiving groove penetrates a bottom of the mounting groove, and a part of the structure of the slave device is accommodated in the mounting groove when the slave device is installed on the main body.

8. The mobile phone according to claim 7, wherein:
the main body comprises a camera assembly;
the camera assembly comprises a first camera and a second camera;
a light incident surface of the first camera and a light incident surface of the second camera are exposed out of the rear surface;
a thickness of the first camera is less than a thickness of the second camera;
the first camera overlaps a bottom of the receiving groove, and the second camera is misaligned with the bottom of the receiving groove; and
an opening of the receiving groove faces away from the first camera.

9. The mobile phone according to claim 8, wherein:
the main body comprises a side surface connected to and between the front surface and the rear surface;
the receiving groove penetrates the front surface and the side surface;
the side surface comprises a top surface, a bottom surface opposite to the top surface, a left surface and a right surface opposite to the left surface, wherein the top surface is connected to one end of each of the left surface and the right surface, and the bottom surface is connected to the other end of each of the left surface and the right surface;
a distance between the top surface and the bottom surface is a length of the master device and a distance between the left surface and the right surface is a width of the master device;
a size of the orthographic projection of the bottom of the receiving groove on the front surface is not greater than a size of the orthographic projection of the first camera on the front surface in the length direction of the master device; and
an orthographic projection of the bottom of the receiving groove on the front surface overlaps an orthographic projection of the first camera on the front surface in the width direction of the master device.

10. The mobile phone according to claim 7, wherein:
the main body comprises a camera assembly and a flash assembly;

a light incident surface of the camera assembly and a light-exiting surface of the flash assembly are exposed out of the rear surface;

a thickness of the flash assembly is less than a thickness of the camera assembly; and the flash assembly is stacked on a bottom of the receiving groove, and the camera assembly is misaligned with the bottom of the receiving groove so that the opening of the receiving groove faces away from the flash assembly.

11. The mobile phone according to claim 7, wherein the main body comprises a magnetic attraction member, the slave device further comprises a magnetic attraction fitting member, the magnetic attraction member attracts the magnetic attraction fitting member to connect the slave device to the main body when the slave device is stacked on the front end from a side where the rear surface of the slave device is located or a side where the front surface of the slave device is located.

12. The mobile phone according to claim 7, wherein:

the slave device further comprises a keyboard, a slave device controller, a slave device wireless transceiver unit, and a display screen;

the master device further comprises a wireless modem unit, a master device controller, and a master device wireless transceiver unit communicable with the slave device wireless transceiver unit;

a control command output by the keyboard is modulated by the slave device wireless transceiver unit and sent to the master device wireless transceiver unit under control of the slave device controller, and is modulated by the wireless modem unit and sent to the air under control of the master device controller; and a control signal from the air is demodulated by the wireless modem unit, passed through the master device controller, modulated by the master device wireless transceiver unit and sent to the slave device, and is displayed by the display screen under the control of the slave device controller after received by the slave device wireless transceiver unit in a first working state of the mobile phone.

13. The mobile phone according to claim 7, wherein:

the slave device further comprises a slave device controller, a microphone, a receiver, a slave device wireless transceiver unit, an audio coder, and an audio decoder;

the master device further comprises a wireless modem unit, a master device controller, and a master device wireless transceiver unit communicable with the slave device wireless transceiver unit;

an audio signal from the microphone is coded by the audio coder and transmitted to the slave device controller, and is sent to the master device wireless transceiver unit under the control of the slave device controller;

the coded audio signal is transmitted to the wireless modem unit and sent to the air after modulated by the wireless modem unit under the control of the master device controller;

the signal from the air is demodulated by the wireless modem unit and sent to the master device controller, under the control of the master device controller and is transmitted to the master device wireless transceiver unit and sent to the slave device after modulated by the master device wireless transceiver; and a demodulated audio signal by the slave device wireless transceiver unit is decoded by the slave device audio decoder and output by the receiver under the control of the slave device controller in a second working state of the mobile phone.

14. The mobile phone according to claim 7, wherein:

the slave device further comprises a slave device controller and a slave device wireless transceiver unit;

the master device further comprises a wireless modem unit, a master device controller, and a master device wireless transceiver unit communicable with the slave device wireless transceiver unit;

the master device controller is capable of communicating with the wireless modem unit and the master device wireless transceiver unit; and the slave device is accessible to a communication network through the master device.

15. The mobile phone according to claim 7, wherein:

the slave device further comprises a slave device controller and a first wireless communication unit, wherein the slave device controller is communicable with the first wireless communication unit;

the master device further comprises a master device controller, a second master device wireless communication unit, and a third master device wireless communication unit;

the master device controller is communicable with the second master device wireless communication unit and the third master device wireless communication unit;

the second wireless communication unit is communicable with the first wireless communication unit; and the third master device wireless communication unit is communicable with a base station.

16. A terminal device, comprising:

a master device comprises a main body and a bracket, wherein the main body is provided with a receiving groove, and the bracket is connected to the main body and is rotatable with respect to the main body so as to be received in the receiving groove or lean against the main body; and a slave device capable of being installed on the main body and detached from the main body, wherein the bracket is accommodated in the receiving groove, the slave device is able to be stacked on the main body and cover the bracket, and the slave device is able to lean against the bracket to stand on the main body when the bracket stands on the main body, wherein the main body is provided with a mounting groove, and the receiving groove is located at the bottom of the mounting groove;

the main body further comprises a magnetic attraction member, and the slave device further comprise a display screen and a magnetic attraction fitting member; and the slave device is able to overlap the main body from a side where the display screen is located or from a side away from the display screen, so that a part of the structure of the slave device is able to be accommodated in the mounting groove, and the magnetic attraction member is able to attract the magnetic attraction fitting member.

* * * * *